Aug. 30, 1949.  J. G. MEJEAN ET AL  2,480,495
PRESSURE ACTUATED SWITCH

Filed Feb. 22, 1945  3 Sheets-Sheet 1

INVENTOR.
Jacques G. Mejean
Donald V. Healy
BY
Benj. T. Rauber
ATTORNEY

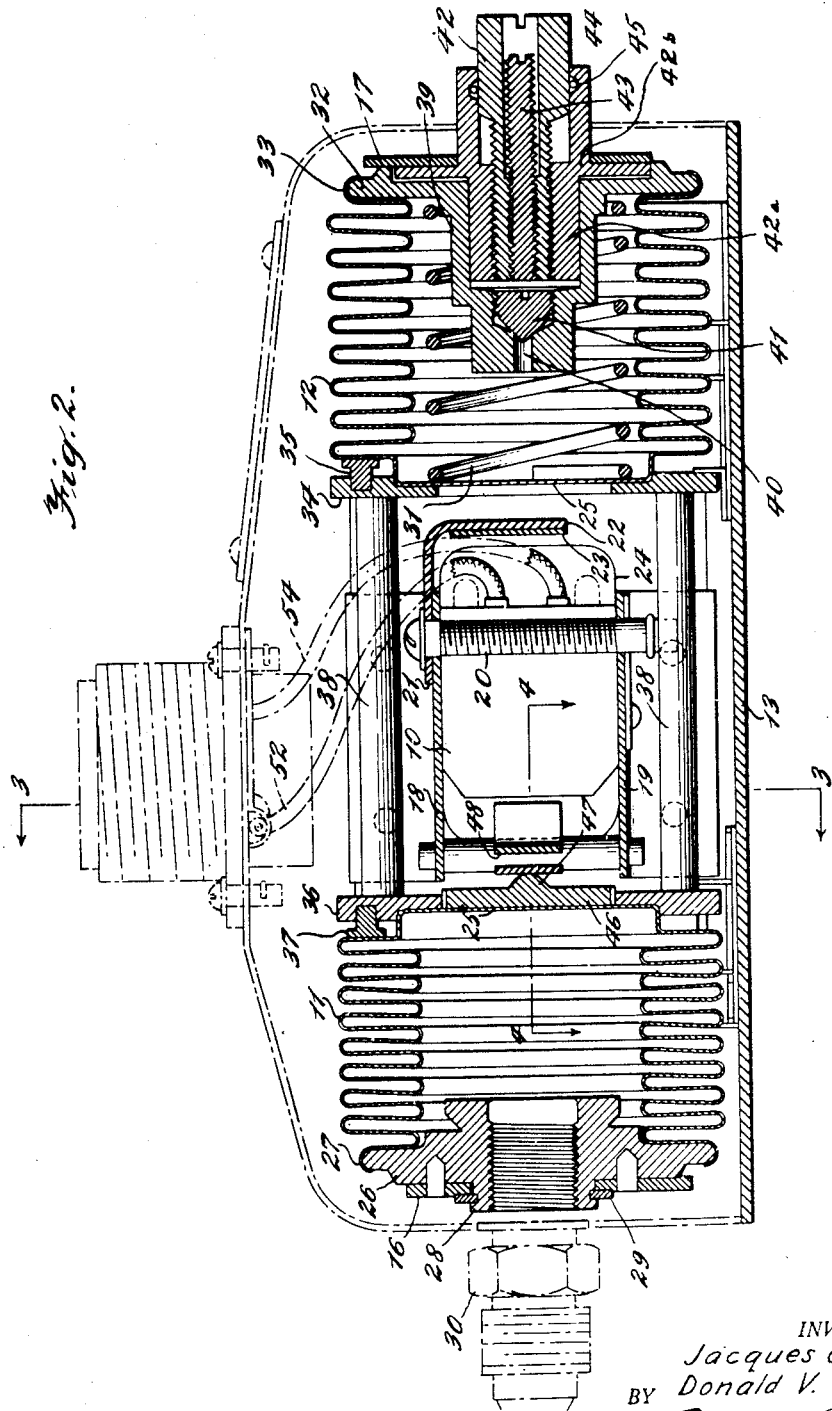

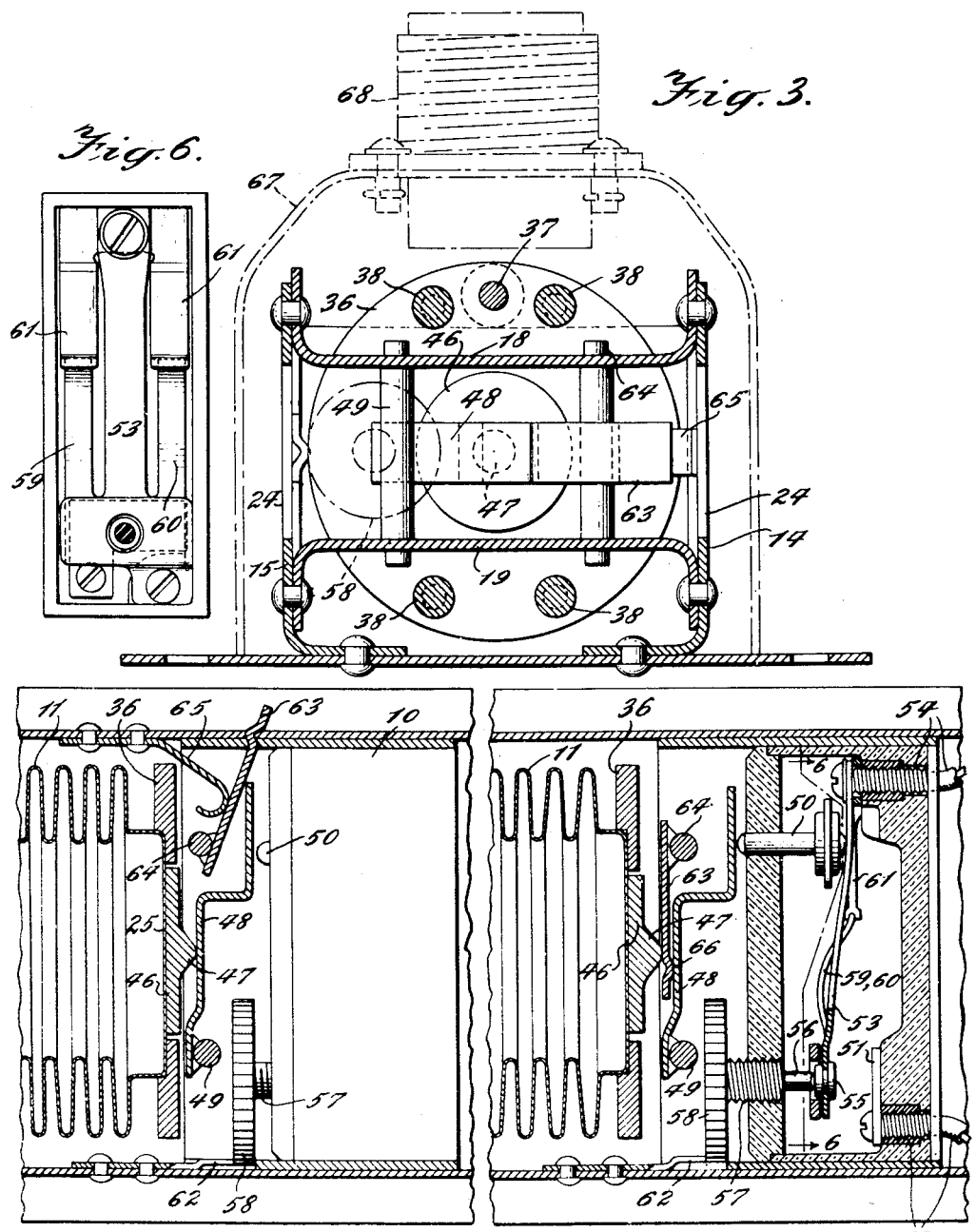

Patented Aug. 30, 1949

2,480,495

UNITED STATES PATENT OFFICE 2,480,495

PRESSURE ACTUATED SWITCH

Jacques G. Mejean, Darien, Conn., and Donald V. Healy, Armonk, N. Y., assignors, by mesne assignments, to The Aerotec Corporation, Greenwich, Conn., a corporation of Connecticut Application February 22, 1945, Serial No. 579,258

16 Claims. (Cl. 200—81.5)

Our invention relates to an electric control apparatus and more particularly to a pressure control switch mechanism of an electric circuit controlling the driving of water pump for water injection in internal combustion engines such as those used on aircraft.

In the application of the invention to control the water injection in an aircraft engine the actuation of the apparatus is controlled by the manifold pressure to close the circuit and start the pump when the manifold pressure reaches a certain selected or predetermined absolute pressure and to open and stop the pump when the pressure falls to a value somewhat below that at which the circuit is closed and the pump started.

The actuation of the apparatus must be independent of atmospheric pressures and temperatures. The absolute manifold pressure at which the switch closes should be adjustable to suit the apparatus to different or varying conditions of operation and the differential between the pressure at which the switch is closed and at which it is opened must also be adjustable.

In our present invention we provide an electric control apparatus of the above type which permits the closing of the switch at any predetermined manifold pressure independent of altitude and of atmospheric pressures and temperatures and in which also the difference between closing and opening pressures may be adjusted.

In our invention we provide in an electric switch which snaps open or closed under spring pressure upon movement of an actuating element, an adjusting screw to adjust the relative positions of the actuating element at which the switch is closed and opened respectively.

The switch is opened and closed by the action of a pressure responsive element or bellows in fixed position relative to the switch and having a plate movable to or from the switch as pressure fluid is supplied from the manifold to the bellows or withdrawn therefrom under varying pressures.

The moving plate or element of the bellows transmits motion to the actuating pin or element of the switch through a lever or equivalent element to give a definite movement to the operating mechanism of the switch relative to the movement of the movable plate of the bellows.

Inasmuch as the adjustment of the gap in the switch may be less than is required for the maximum range of movement of the bellows plate, a second lever is provided which may be swung into position between the bellows and the transmitting lever, or out of position to give two ranges of movement and thus widening the range of pressure at which the switch will be respectively closed and opened.

The pressure supplied to the actuating bellows is opposed or balanced by a second bellows which is sealed to the air and is under high vacuum. The second bellows has one plate in fixed relation to the switch and to the pressure responsive bellows and a movable plate opposed to the movable plate of the pressure responsive bellows and of the same area and connected rigidly to the movable plate of the pressure responsive bellows. A spring, preferably mounted within the sealed bellows, presses the movable plate of the sealed bellows and through the rigid connection exerts this pressure on the movable plate of the pressure responsive bellows against the fluid pressure transmitted thereto. In this way any changes in atmospheric pressure are balanced between the two plates acting equally in opposite directions. Also inasmuch as there is no substantial amount of gas or other fluid within the sealed bellows to expand or contract with changes in temperature and thus to exert a varying pressure, the pressure exerted against the manifold fluid pressure is, therefore, independent of both atmospheric temperatures and pressures.

The position of the sealed bellows and spring may be adjusted toward or from the pressure responsive bellows to vary the pressure required to close the switch.

The various features of the invention are illustrated, by way of example, in the accompanying drawings in which:

Fig. 2 is a vertical section taken on the line 2—2 of Fig. 1;

Fig. 3 is a vertical section taken on the line 3—3 of Fig. 2 and at a right angle to the section of Fig. 2;

Figs. 4 and 5 are sectional views taken on the line 4—4 of Fig. 2 showing two different positions for the transmitting levers between the pressure responsive bellows and the switch, and Fig. 6 is a detail view of parts of the switch.

Figure 1:
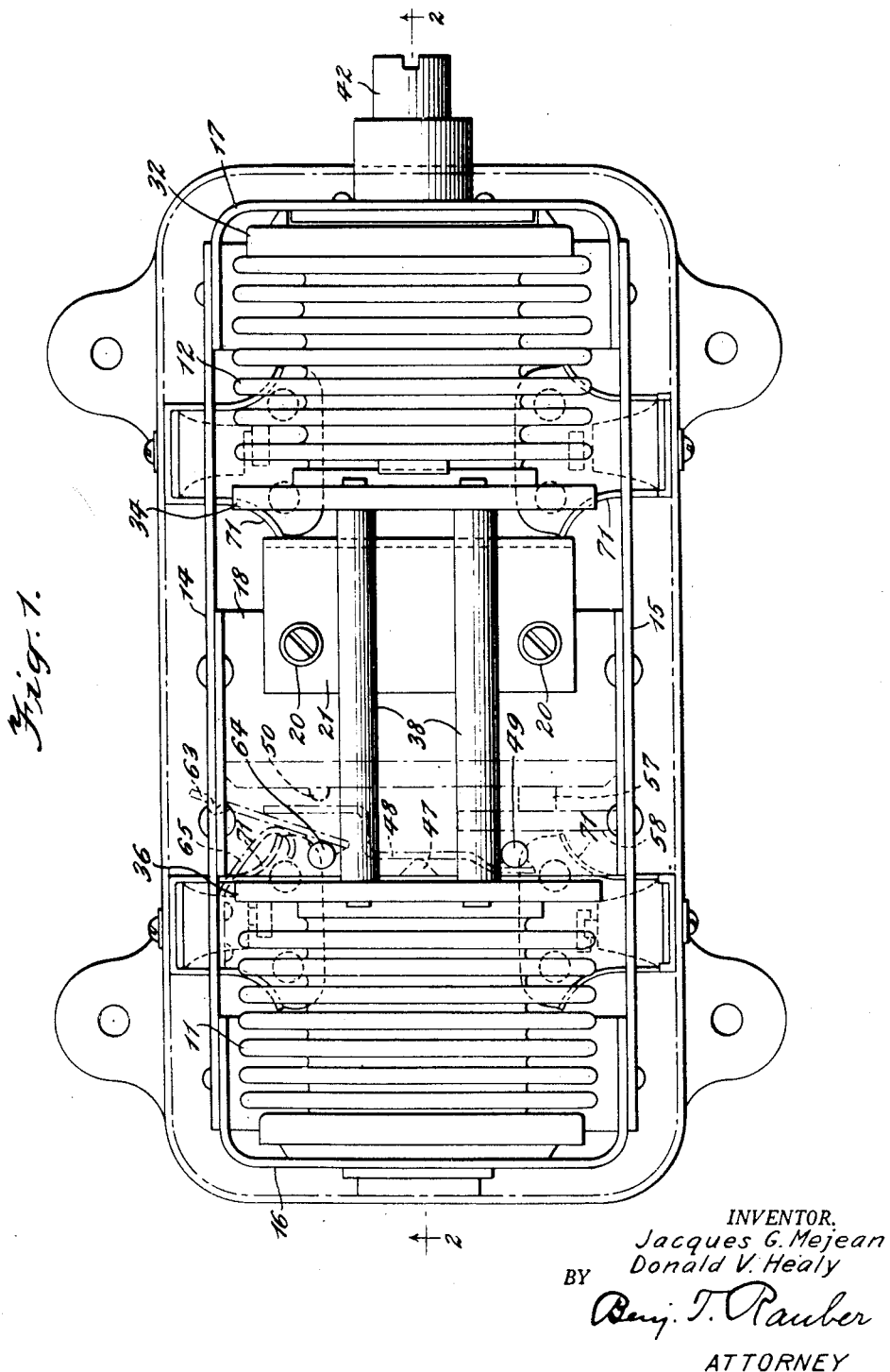
Fig. 1 is a plan view of a control mechanism embodying a preferred form of the invention, the cover being removed to expose the operating elements.

In the embodiment of the invention illustrated in the accompanying drawings a switch 10 is mounted on a common base or chassis between a pressure responsive bellows 11 and a sealed bellows 12. The chassis on which the above elements are mounted comprises a base plate 13 on which are mounted, as for example by riveting, a pair of vertical side plates 14 and 15, Figs.

1 and 3. These side plates are joined at their ends by connecting plates 16 and 17, Figs. 1 and 2, and are also joined between the bellows 11 and 12 by transverse spaced horizontal bridge plates 18 and 19 between which is mounted the switch 10 by means of screws 20 passing through the bridge plates and through the switch.

The switch may be protected also by a plate 21 having a flange bolted onto the upper bridge 18 and a depending plate 22 which may be faced with insulation 23. As indicated in Figs. 2 and 3, the side plates 14 and 15 may have openings or windows 24 through which the switch 10 may be accessible. With the above mounting the switch is, therefore, mounted in fixed position on the frame or chassis between the pressure responsive bellows 11 and the pressure opposing or balancing bellows 12.

The bellows 11 is formed with a closed front end 25 and corrugated walls extending therefrom to an end plate 26 on which the opposite end of the corrugated wall is spun as shown at 27 and soldered to a fluid-tight union. The fixed end 26 of the bellows has a short nipple 28 extending through an opening in the end plate 16 and is provided with a groove into which a spring clip 29 may be sprung to secure the end 26 rigidly on the plate 16 and thus in fixed spacial relation to the switch 10. The end 16 is also provided with an internally threaded opening to which may be threaded the end of the connector 30 which leads to the intake manifold of the engine and through which the manifold pressure may be transmitted to the interior of the control bellows.

The pressure transmitted from the manifold through the connector 30 to the front or movable end of the bellows is opposed or balanced by a spring 31 within the sealed bellows 12 and the variations in atmospheric pressure on the bellows 11 are compensated by the bellows 12 which is, for this purpose, of the same diameter.

The bellows 12 has a closed end 32 on the opposite side of the switch from the movable end 25 of the pressure responsive bellows 11 and has corrugated walls extending from this closed end to the end piece 32 onto which the ends of the corrugated walls are turned and soldered as at 33.

The end 32 is supported on the end plate 17 as shown in Fig. 2 but may be adjusted forwardly thereon. In any adjusted position it is, however, in fixed spacial relation to the switch 10 and to the fixed end 26 of the pressure responsive bellows 11.

The closed movable end 32 of the bellows 12 bears on a vertical annular plate or ring 34 being positioned thereon by locating devices 35. A similar annular plate or ring 36 is provided against the movable end 25 of the bellows 11 and positioned by locating devices 37.

The plates 34 and 36 are rigidly connected to each other by connecting posts 38, four being shown by way of example in the drawings. These connectors, therefore, connect together the two plates 34 and 36 so that the pressure of the spring 31 will be transmitted directly to the free end 25 of the pressure responsive bellows 11 and balance the pressure transmitted thereto.

As the pressure in the bellows 11 increases it moves the end plate toward the switch 10 and as this pressure decreases the spring 31 correspondingly forces the end 25 away from the switch until a balance is reached.

It will be apparent also that inasmuch as the cross-sectional areas of the two bellows are the same atmospheric pressure acts equally and oppositely on the faces 25 and 32 so that the pressure opposing the manifold pressure is independent of atmospheric pressure.

To render the pressures independent of temperature conditions the compensating bellows 12 is evacuated to a high vacuum and sealed to the atmosphere so that there will be substantially no fluid to expand or contract due to varying temperatures. For this purpose the stationary mounted end 32 of the bellows 12 has an extension 39 within the bellows and a stepped recess which terminates in a port 40 through which the bellows may be evacuated. When sufficiently evacuated the port 40 is closed by a conical plug 41 which may be tightly screwed into the port 40 and sealed therein by solder.

By moving the supporting end 32 forwardly from the supporting plate 17 the spring 31 may be compressed increasing the pressure on the free end 25 of the bellows 11 through the connecting plates 34, 36 and the posts or rods 38 and thus the manifold pressure required to move the end 25 of the bellows to any given position may be controlled. In this way the pressure at which the switch is to close may be adjusted. For this purpose a hollow screw 42 is screwed into an internally threaded projection 42a of a support 42b mounted on the end plate 17. Within the hollow screw 42 is a second screw 43 which may be screwed forwardly of the hollow screw 42.

In adjusting the pressure at which the switch is to open the hollow screw 42 is set at the setting at which the switch must close. Fluid pressure is then supplied to the bellows 11 until it equals the value at which the switch is to close, then holding the screw 42 in its original position the screw 43 is screwed forwardly until the switch operates. It is then set by means of either paint or solder.

If in the future it is desired to change the value of the pressure at which the switch operates this can be done by merely turning the adjusting screw 42 which is calibrated as, for example, in inches of mercury to push the spring 31 and bellows toward or from the bellows 11. The adjusting screw 42 may be held from free rotation by means of a ring of rubber, 44, or other gripping element, in a recess 45 of the projection 42a so that the adjusting screw will not be turned by vibrations.

When the pressure within the bellows 11 increases it moves the end 25 toward the switch against the pressure of the spring 31 and bellows 12 to a point at which the switch is closed. For this purpose motion of the end 25 is transmitted to a plate 46 resting directly on the end 25 and provided with a projection 47 through which motion is transmitted.

The motion of the plate 46 and projection 47 may be received directly on a lever 48, Fig. 4, pivoted on a vertical fulcrum pin 49, Figs. 3 and 4. The lever 48 in turn presses against an operating pin 50 of the switch 10 to close the switch.

As the pressure within the bellows 11 reaches that at which the switch is to operate the plate 46 will have moved the lever 48 and the pin 50 to the point at which the switch closes. When the pressure in the bellows 11 drops the plate 46 and lever 48 are free to swing away from the pin 50 and the switch will open when the pressure in the bellows falls to the point set for the opening of the switch.

The switch 10 is of a type in which the actuating element or pin 50 must be moved further into the switch to close the latter than is required to hold it closed and, therefore, provides a gap between the closing and opening positions. Any suitable switch having this gap may be employed. That shown in Figs. 5 and 6 will merely serve as an example.

The switch of the present invention is provided with a terminal plate 51 for connection to one lead 52 of the electric circuit and with a spring blade 53 mounted rigidly at one end in the casing of the switch and connected to the other lead 54.

The spring 53 carries at its free end a contact 55 which may move into contact with the plate 51 to close the circuit upon sufficient pressure being applied through the pin 50. In open position the free end of the blade 53 is stopped by an adjustable stop pin 56 of insulating material carried on a screw 57 in a casing of the switch and having a milled adjusting wheel 58.

The free end of the blade 53 is integral with a pair of curved springs 59 and 60, the free ends of which in turn are received in and bear against recesses on fixed plates 61, in the case of the switch, the springs 59 and 60 being compressed and tensioned between their connection to the end of the blade 53 and the recessed plate 61. The springs 59 and 60 act to bend the contact plate or blade 53 upwardly toward the pin 56 of the screw 57 with a component of force which decreases as the blade is swung downwardly toward the contact plate 51.

When the pin 56 is positioned as in Fig. 5 to provide the widest gap it is, therefore, necessary in order to close the switch to exert considerable pressure on the blade 53, which bends somewhat under this pressure, and, therefore, to move the actuating pin 50 farther into the switch than when the pin 56 is moved closer to the contact plate 51. This requires a higher pressure in the bellows 11.

When the milled wheel 58 is rotated to move the pin 56 toward the plate 51 the component of pressure of the spring on the blade 53 decreases, the pin 50 requires less pressure with less bending of the blade 53 and, therefore, a lesser movement of the bellows 11 and a lower manifold pressure to close the switch.

A spring 62 bearing against the edge of the wheel 58 serves to prevent the screw 57 from being rotated by vibrations and a calibrating scale may be provided to indicate the position of the pin 56 and corresponding air gap or pressure range.

It will be apparent that by varying the position of the pin 56 the bellows pressure required to close the switch may be varied but that the switch will open whenever the actuating pin 50 is free to move back to a definite position regardless of whatever pressure may be required to close the switch. Consequently by adjusting the pin 56 the difference in pressure required to close the switch, or permit its opening, may be varied within the limits of the air gap.

It may be desirable at times to have a wider range between opening and closing pressures than can be obtained readily with a switch of the above type. For example a range of pressure difference between the closing and opening of the switch of from ¾" to 10" of mercury might be required. With a maximum air gap of 0.080" corresponding to the 10" pressure differential the air gap for the minimum pressure differential would be only 0.005", and, therefore, not sufficient for the required current, which might require at least 0.020". On the other hand, if a 0.020" air gap were used for the minimum pressure differential, then for a gap of 0.080" a pressure difference between opening and closing of only 5" of mercury could be obtained.

To permit of a wider range of pressure differential, a second or auxiliary lever 63 has been provided pivotally mounted on a rock shaft 64 in such a position that it may be swung to the position shown in Fig. 4 clear of the lever 48 and against a spring 65, or to the position shown in Fig. 5 between the projection 47 of the plate 46 and the lever 48 in such manner as to form a compound system of levers.

In this system the force or motion of the bellows 11 is transmitted through projection 47 to the lever 63 and through a projection 66 on the latter to the lever 48. The movement of the plate 46 is, therefore, magnified by the action of the lever 63 increasing the movement of the pin 50 for a given movement of the bellows 11 and plate 46. When the lever 48 alone is used a differential range of from ¾" with an air gap of 0.020" between the contacts 51 and 55 may be obtained, and by varying the adjustment wheel 58 a differential of 5" of mercury with an air gap of 0.080". When the lever 63 is placed in the position shown in Fig. 5 a pressure differential of 4" of mercury can be obtained with an air gap of 0.020" and a pressure differential of 10" of mercury may be obtained through the added leverage with a gap of 0.080". It will be understood, however, that the above figures are merely by way of example.

The switch, bellows and chassis may be enclosed by a suitable cover 67 on which is fastened an electric connector 68. Electric contacting wires 52 and 54 are soldered in the connector 68 and at their other ends are soldered to the switch terminals. When the cover is closed these wires may be imprisoned between the cover and chassis in such a way that they are not subject to vibration. The cover is fastened to the base plate by means of four angle nuts 71 in such a way that the stresses on the cover will not be transmitted to the chassis and will not affect the setting of the apparatus.

Résumé

In résumé it may be noted that pressure supplied to the pressure responsive bellows 11 serves to move the actuating plate 46 and to press the projection 47 against the lever 48 either directly, when in the position of Fig. 4, or through the lever 63, when the latter is in the position of Fig. 5, to multiply the movement of the lever 48 relative to the movement of the plate 46.

By manual adjustment of the wheel 58 and the screw 57 and pin 56 the air gap between the terminals 51 and 55 of the switch may be adjusted and accordingly the pressure required to close the switch and the movement of the pin 50 required for this pressure. For a limited air gap the range of pressure is increased by the use of the auxiliary lever 63.

The pressure supplied to the bellows 11 is balanced by the spring 31 confined between the adjustable support 32 and the movable plate 34 which is connected by the post 38 to the plate 36 against which the free end of the bellows 11 presses. Variations in atmospheric pressure on the bellows 11 are compensated by the sealed compensating bellows 12 which also acts against the plate 34, and being of the same diameter as the bellows 11 receives atmospheric pressure in equal and contrary acting direction, therefore, counterbalancing the effect of atmospheric pressure and making the action of the bellows independent of this pressure.

To eliminate any temperature effects that would be obtained by confinement of the gas or fluid inside the bellows 11 this bellows is evacuated to a point where the effect with any residual gas or fluid would be negligible. The pressure at which the apparatus is to act is adjusted through the adjusting screw 42 and the inner screw 43. The pressure of the adjusting screw for a certain pressure is set by the manufacturer. Pressure of the value set by the screw 42 is then admitted to the bellows 11 and then while holding the screw 42 in its set position the screw 43 is screwed forward until the switch operates and is then fixed by solder or paint. The operating pressure thus being accurately set for a given setting of the screw 42 the value of the pressure at which the switch operates can be adjusted by merely turning the adjusting screw 42 which may be calibrated in inches of mercury.

When the apparatus is to be used for the control of a water supply pump for jet injection in an aircraft engine the connector 30 will be connected to the intake manifold. As the pressure rises to a given point at which the electric circuit is to be closed as, for example, from 48" to 60" of mercury absolute, the bellows 11 will close the switch, the switch will remain closed while the pressure is maintained and to a pressure somewhat less than that of the closing pressure depending upon the setting of the air gap and the position of the lever 63. Thus the apparatus may be set to close the switch at 55" of mercury and to open it at 50" of mercury. It will be understood, of course, that the above figures are solely by way of example.

What we claim is:

1. An electric control device which comprises an electric switch having a variable operating gap between opening and closing, a pressure responsive bellows mounted in fixed position relative to said switch and having an element movable by fluid pressure to close said switch, a pivoted lever between said element and said switch to multiply the movement of said element, and a second lever movable into and out of position to multiply the movement between said element and said first lever.

2. An electric control device which comprises an electric switch having a variable operating gap between opening and closing, means to vary said operating gap, a pressure responsive bellows mounted in fixed position relative to said switch and having an element movable by fluid pressure to close said switch, a pivoted lever between said element and said switch to multiply the movement of said element, and a second lever movable into and out of position to multiply the movement between said element and said first lever.

3. An electric control device which comprises an electric switch having a variable operating gap between opening and closing, means to vary the operating gap of said switch, a pressure responsive bellows mounted in fixed position relative to said switch and having an element movable by fluid pressure to close said switch and means between said bellows and said switch to vary the movement of said switch relative to the moving element of said bellows.

4. An electric control device which comprises an electric switch having a variable operating gap between opening and closing, a pressure responsive bellows mounted in fixed position relative to said switch and having an element movable by fluid pressure in said bellows to close said switch, means for transmitting movement from said bellows to said switch in relative adjustable proportions, a pressure compensating bellows under vacuum and sealed to the atmosphere mounted in fixed relation to said pressure responsive bellows and having a movable plate secured to the movable element of said pressure responsive bellows and a spring pressing said movable plate and element against the pressure in said pressure responsive bellows.

5. An electric control device which comprises an electric switch having a variable operating gap between opening and closing, a pressure responsive bellows mounted in fixed position relative to said switch and having an element movable by fluid pressure in said bellows to close said switch, means for transmitting motion in adjustable relation from said pressure responsive bellows to said switch and a pressure compensating bellows under vacuum and sealed to the atmosphere mounted in fixed relation to said pressure responsive bellows and having a movable plate and means connecting said plate to the movable element of said pressure responsive bellows to oppose and balance the fluid pressure therein, a spring pressing the movable plate of said compensating bellows against the pressure of said pressure responsive bellows and adjustment means to compress said spring toward said pressure responsive bellows.

6. The apparatus of claim 5 in which said spring is within said pressure compensating bellows.

7. An electric control device which comprises a chassis, a control switch mounted on said chassis and having an operating pin, a pressure responsive bellows mounted on said chassis and having a movable face to contact and actuate said pin, a compensating bellows sealed under high vacuum mounted on said chassis and having a movable face secured to the movable face of said pressure responsive bellows, a spring in said sealed bellows confined to press the movable faces of said bellows from switch actuating position, means to adjust the position of said sealed bellows on said chassis comprising an outer adjusting screw threaded onto a fixed part of said chassis and an inner setting screw threaded in said outer screw and supporting said compensating bellows and spring.

8. An electric control mechanism which comprises a chassis having a base and end supporting plates extending upwardly from said base and a transverse switch supporting plate between and spaced from said end supporting plates, an electric switch on said switch supporting plate, a pressure responsive bellows mounted on one of said end plates and extending toward said switch and having means to operate said switch, a compensating bellows sealed to the atmosphere under high pressure mounted on the other of said end supporting plates and extending in the opposite direction toward said switch, the free ends of said bellows being connected together in fixed position relative to each other and a spring opposing the fluid pressure of said fluid pressure bellows.

9. An electric control mechanism which comprises a base plate, a pair of end supports, a switch supporting plate between said end supports, a switch mounted on said switch supporting plate, a fluid pressure actuated means on one of said end plates having transmission means to operate said switch under fluid pressure, a compensating bellows on the opposite end support sealed under vacuum, means connecting the movable parts of said bellows and said pressure actuated means in fixed relation to each other and a spring opposing the fluid pressure in said fluid pressure actuated means.

10. An electric control device which comprises an electric switch having a fixed contact, a leaf spring having a contact at its free end to move to and from said fixed contact and having a spring means to move said free end away from said fixed contact with increasing force, an adjustable stop for the free end of said spring, an actuating pin bearing against said leaf spring near its fixed end to move said leaf spring toward said fixed contact, fluid pressure means to move said pin against said spring and a means to balance the atmospheric pressure on said fluid pressure means.

11. An electric control device which comprises an electric switch having a fixed contact, a leaf spring having a contact at its free end to move to and from said fixed contact and having a spring means to move said free end away from said fixed contact with increasing force, an adjustable stop for the free end of said spring, an actuating pin bearing against said leaf spring near its fixed end to move said leaf spring toward said fixed contact, fluid pressure means to move said pin against said spring and a vacuated bellows opposed to said fluid pressure means and of a size to counterbalance changes in atmospheric pressure.

12. An electric control device which comprises an electric switch having a fixed contact, a leaf spring having a contact at its free end movable to and from said fixed contact and having a spring means to move said free end away from said fixed contact with increasing force, an adjustable stop for the free end of said spring, an actuating pin bearing against said leaf spring near its fixed end to move it to said fixed contact, a fluid pressure operated bellows to move said pin against said spring and a compensating vacuated bellows opposed to said fluid operated bellows of substantially equal diameter to counterbalance the effect of changes of atmospheric pressure.

13. An electric control device which comprises an electric switch having a fixed contact, a leaf spring having a contact at its free end movable to and from said fixed contact and having a spring means to move said free end away from said fixed contact with increasing force, an adjustable stop for the free end of said spring, an actuating pin bearing against said leaf spring near its fixed end to move it to said fixed contact, a fluid pressure operated bellows to move said pin against said spring, a compensating vacuated bellows opposed to said fluid operated bellows of substantially equal diameter to counterbalance the effect of changes of atmospheric pressure and a spring actuating against said fluid actuated bellows and adjustable to adjust the pressure thereagainst.

14. An electric control device which comprises an electric switch having a fixed contact, a leaf spring having a contact at its free end to move to and from said fixed contact and having spring means to move said free end away from said fixed contact with increasing force, an adjustable stop for the free end of said spring, an actuating pin bearing against said leaf spring near its fixed end to move it to said fixed contact, fluid pressure actuated means, a pair of compound levers between said bellows and said pin, one of said levers being capable of moving out of operating position relative to said bellows and said pin to change the relative rates of movement of bellows and pin.

15. An electric control device which comprises an electric switch having an operating gap between opening and closing, a pressure responsive means mounted in fixed position relative to said switch and having an element movable by fluid pressure to close said switch and a compensating vacuum bellows which comprises an adjustably mounted base plate having a recess, a supporting plate having an internally threaded hollow projection extending into said recess, an outer hollow screw threaded into said projection and an inner screw threaded in said outer screw to abut the end of said recess.

16. The control device of claim 15 in which said compensating bellows comprises a plate movable relatively to said base plate and a spring between said base plate and said movable plate.

JACQUES G. MEJEAN.
DONALD V. HEALY.

REFERENCES CITED

The following references are of record in the file of this patent:

UNITED STATES PATENTS

| Number | Name | Date |
| --- | --- | --- |
| 1,423,880 | Powers | July 25, 1922 |
| 1,616,519 | Twombly | Feb. 8, 1927 |
| 1,960,020 | McGall | May 22, 1934 |
| 1,978,862 | Gregg | Oct. 30, 1934 |
| 2,033,410 | Dezotell | Mar. 10, 1936 |
| 2,033,417 | Dezotell | Mar. 10, 1936 |
| 2,170,767 | Richie | Aug. 22, 1939 |
| 2,283,175 | Berger | May 19, 1942 |
| 2,374,986 | Fetter | May 1, 1945 |
| 2,376,144 | Levine | May 15, 1945 |